United States Patent [19]

Halasa et al.

[11] 4,237,245

[45] Dec. 2, 1980

[54] HYDROGENATED BLOCK COPOLYMERS OF BUTADIENE CONTAINING A BLOCK OF 1,4 AND A BLOCK OF 1,2-MICROSTRUCTURE

[75] Inventors: Adel F. Halasa, Bath; David W. Carlson; James E. Hall, both of Akron, all of Ohio

[73] Assignee: The Firestone Tire & Rubber Company, Akron, Ohio

[21] Appl. No.: 68,308

[22] Filed: Aug. 20, 1979

[51] Int. Cl.[3] .................................................. C08F 8/04

[52] U.S. Cl. ..................................... 525/272; 525/334; 525/338; 525/339

[58] Field of Search ................. 525/339, 338, DIG. 1, 525/DIG. 2, 272, 334

[56] References Cited

U.S. PATENT DOCUMENTS

| | | | |
|---|---|---|---|
| 3,140,278 | 7/1964 | Kuntz | 526/173 |
| 3,700,748 | 10/1972 | Winkler | 260/879 |
| 3,823,203 | 7/1974 | De LaMare | 525/338 |
| 3,830,880 | 8/1974 | De LaMare | 526/173 |
| 3,899,474 | 8/1975 | Goldenberg et al. | 525/338 |
| 4,107,236 | 8/1978 | Naylor | 525/272 |

*Primary Examiner*—William F. Hamrock

[57] ABSTRACT

The composition described herein is a hydrogenated polymer derived from a butadiene diblock copolymer having 85–100%, preferably 95–100% 1,2-structure in one block and the other block comprising essentially 1,4-butadiene. The 1,2-block comprises at least 10%, preferably at least 25%, of the total weight of the diblock copolymer. The hydrogenated product is an elastomeric material which is oxidation-resistant and stable against ozone. Moreover, since the original polymer may be made by a method which permits control of the molecular weight, the molecular weight of the ultimate hydrogenated product is also controllable. The control of molecular weight and microstructure give highly desirable properties in the ultimate elastomeric product, and also control of tacticity and crystallinity.

3 Claims, No Drawings

HYDROGENATED BLOCK COPOLYMERS OF BUTADIENE CONTAINING A BLOCK OF 1,4 AND A BLOCK OF 1,2-MICROSTRUCTURE

BACKGROUND OF THE INVENTION

1. Field of the Invention

This invention relates to the production of elastomeric hydrogenated butadiene diblock copolymer having one block of high vinyl content. More specifically it relates to an elastomer of controlled molecular weight and of desired branching in the microstructure. Still more specifically it relates to an elastomeric butadiene having good resistance to oxidation and stability against ozone.

2. Related Prior Art

The most pertinent references found with regard to hydrogenated products of polybutadienes having substantial amounts of 1,2-microstructure are the articles by E. W. Duck et al which appeared in "Journal of the IRI", pages 223–227 of the October 1968 issue and pages 19–22 of the February 1972 issue. However, neither of these publications show the hydrogenation of polybutadienes having more than 60% vinyl structure.

Langer et al, U.S. Pat. No. 3,451,988 shows a method for preparing polybutadiene having higher amounts of 1,2-microstructure. However, there is no reference to hydrogenation of such products nor is there any indication of the properties or type of products produced by such hydrogenation.

A number of patents describe the hydrogenation of block copolymers in which one block is polybutadiene and another block is polystyrene, such as U.S. Pat. Nos. 3,485,787; 3,644,588; 3,686,365 and 3,827,999. However, none of these disclose the hydrogenation of a polybutadiene block high in 1,2-structure nor of a diblock copolymer in which the second block is also a polybutadiene block but predominantly of 1,4-structure.

U.S. Pat. Nos. 3,140,278 and 3,830,880 describe the preparation of butadiene diblock copolymers in which one block is predominantly 1,4-polybutadiene and the other block is predominantly 1,2-polybutadiene. The 1,4 block is prepared using a hydrocarbon solvent containing butadiene and n-BuLi. When polymerization is completed, an ether or tertiary amine is added together with additional butadiene monomer and polymerization continued to give a second block of predominantly 1,2-polybutadiene. The reverse order may also be used to produce the 1,2 block first and then adding an agent to inactivate the ether or amine so as to produce the 1,4 block. However, neither of these patents refers to the hydrogenation of such diblock copolymers nor the type of products that would be produced thereby.

SUMMARY OF THE INVENTION

In accordacne with the present invention it has been found that elastomers of good oxidation resistance, of good stability against ozone, good tacticity and crystallinity, of controlled molecular weight and of good thermoplastic elastomeric properties may be prepared by the hydrogenation of butadiene diblock copolymers in which one block has 85–100%, preferably 95–100% 1,2-configuration and the other block is predominantly of 1,4-configuration. These copolymers have both crystalline blocks and amorphous blocks as indicated by the glass transition temperatures (Tg) and the melting points (Tm).

The high vinyl polybutadiene block may be prepared by any method suitable for this purpose but it has been found particularly effective to produce such high vinyl polybutadienes by an anionic catalyst system. Particularly suitable for this purpose is an alkyl lithium catalyst modified with a chelating bifunctional Lewis base such as 1,2-di-(N-methyl-piperazinyl-N')-ethane (DMPE).

The hydrogenation is effected by any appropriate method capable of hydrogenating advantageously 85–100%, preferably 95–100%, of the original unsaturation leaving residual unsaturation of 0–15%, preferably 0–5%. However where it is desired to effect vulcanization or crosslinking of the polymer, at least 5%, preferably at least 10%, of the unsaturation should be left unhydrogenated. A particularly suitable catalyst system for the hydrogenation comprises a combination of nickel, cyclohexene and triisobutyl aluminum as described more fully below.

The hydrogenated diblock copolymer is particularly resistant to degradation by oxidation or ozone reaction. The highly hydrogenated polybutadiene has little unsaturation in the linear chain, thereby reducing the likelihood that oxidation or ozone reaction will cause rupture of the linear chain. This resistance to oxidation and to ozone reaction is evident in the hydrogenated product by the accompanying resistance to degradation of the polymer chains.

Moreover, since the anionic polymerization system permits close control of the molecular weight of the starting polybutadiene, this means that the molecular weight of the ultimate product may be similarly controlled since the molecular weight of the hydrogenated product is substantially that of the starting high vinyl polymer. The molecular weight ($M_n$) of the hydrogenated product is advantageously in the range of 50,000–1,000,000, preferably 100,000–1,000,000. Furthermore, narrow molecular weight ranges may be desired for specific properties, and the tacticity and crystallinity are likewise controllable.

TYPICAL PROCEDURE FOR PREPARATION OF DIBLOCK COPOLYMER HAVING ONE BLOCK OF HIGH VINYL POLYBUTADIENE

The following typical procedure is used to prepare the diblock copolymer having a high vinyl polybutadiene block: A cleaned 2-gallon stainless steel reactor equipped with stirrer, appropriate heating and cooling means, and appropriate inlets and outlets is prepared for reaction by filling it under a nitrogen atmosphere with hexane and adding n-butyl lithium in an amount sufficient to react with impurities in the hexane and on the surface of the reactor. The mixture is stirred and heated to 150° F. (65° C.) for about an hour. Then this mixture is drained under a nitrogen atmosphere and the material discarded. Next 7.5 lbs. of a blend containing 24% 1,3-butadiene (817 gms. butadiene) and 76% of hexane is charged to the reactor under nitrogen and cooled to 41° F. (5° C.) before adding 16.5 millimoles of n-butyl lithium. Within eight hours of reaction, polymerization is substantially complete to give a 1,4 block of polybutadiene having no more than 15%, generally 12% or less of 1,2 configuration. Next, 33 millimoles of 1,2-di-(N-methyl-piperazinyl-N')-ethane is added, followed by another charge of 7.5 lbs. of a blend containing 24% (817 gms) of butadiene in hexane. The temperature is maintained at 41° F. (5° C.) and efficient stirring effected. After about 8 hours of reaction, the product is dropped into a large volume of isopropanol containing an antioxidant. The precipitated product is recovered and drum-dried to give substantially 100% yield of a diblock copolymer with a 1,4 block of about 50,000 $M_n$ molecular weight and second block of substantially 100% 1,2 content and approximately 50,000 $M_n$.

The overall molecular weight may be increased by decreasing the amount of n-butyl lithium and decreased by increasing the amount of n-butyl lithium,. The relative proportions of the 1,4 and the 1,2 blocks are controlled by the amount of monomer added in the respective polymerization steps. With changes in the amount of n-BuLi used, appropriate changes are made in the amount of DMPE to give a DMPE/Li ratio of approximately 2. The method of varying or controlling the molecular weight by varying the amount of catalyst used per mole of monomer is well known in the anionic polymerization art.

The polymerization temperature has an effect on the 1,2 content of the product with increase in temperature within limits decreasing the 1,2 content, and vice versa within limits. It is generally desirable to maintain a temperature no higher than 41° F. (5° C.) to obtain maximum 1,2 content as shown by the following table:

| Temperature | Approximate 1,2 Content |
|---|---|
| Below 41° F. (5° C.) | 100% |
| 41° F. (5° C.) | 99.8% |
| 48° F. (9° C.) | 98% |
| 75° F. (24° C.) | 97% |
| 85° F. (29° C.) | 95% |
| 90° F. (32° C.) | 90% |
| Above 90° F. (32° C.) | Less than 90% |

While the above procedure is preferred in which the high vinyl block is prepared in the second step, it is also possible to prepare the high vinyl block as a first step and then to deactivate the chelating amine agent so that 1,4 polybutadiene will be produced upon the addition of more butadiene for the second step polymerization.

TYPICAL PROCEDURE FOR HYDROGENATION OF THE DIBLOCK COPOLYMER

The diblock copolymer (1200 gms) is dissolved in 5 gallons of toluene. This polymer solution is transferred to a stainless steel reactor equipped with means for stirring, heating and cooling and with inlet and outlet means. An additional gallon of toluene is added to the original mixing container to dissolve any residue of polymer and the resulting solution is also added to the reactor. The reactor is sealed and heated to 130° F. (55° C.) with stirring and sufficient vacuum is applied to remove any dissolved gases. Then the free space in the reactor is flushed twice with $H_2$ to 50 psi. After each flushing, vacuum is again applied to remove traces of dissolved gases. Then, with a hydrogen atmosphere maintained, the hydrogenation catalyst is added which comprises Ni/cyclohexene/triisobutyl aluminum in the molar ratio of 1/1/3-4 and 25-5 millimoles of Ni per 100 grams of polymer. After the catalyst is added the temperature is raised to 170°-190° F. (77°-88° C.) and hydrogen introduced to 150 psi or more. Since the hydrogenation is diffusion controlled, rapid stirring is effected. When the hydrogen pressure drops to 75-100 psi, the reactor is repressurized with hydrogen to 150 psi or more. Generally hydrogenation is complete in 7-10 hours to 90-99% hydrogenation of the unsaturation.

It has been found that the hydrogenated 1,4 block results in a crystalline domain and the hydrogenated 1,2 block produces an amorphous domain. The crystalline character of the hydrogenated 1,4 block is not disturbed by the presence of 15% or less of 1,2 structure randomly distributed in that block. By varying the molecular weight ($M_n$) of the respective blocks, interesting improvements in properties are found in the hydrogenated diblocks, such as tensile strength, elongation and tear strength. Good rubber characteristics are exhibited by the hydrogenated diblock when the 1,2 block represents at least 10%, preferably at least 25%, by weight of the copolymer.

SPECIFIC EMBODIMENT OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A series of experiments are performed as described above to prepare the 1,4-1,2 diblocks using variations in the amounts of catalyst and monomer in order to prepare variations in the molecular weights of the respective blocks. After the preparation of the 1,4 block, a sample is removed for determination of the molecular weight and the microstructure. Then the DMPE modifier and additional monomer is added for the preparation of the 1,2 block, after which samples are removed for determination of the total molecular weight and the total 1,2 content. From this information the molecular weight and 1,2 content of the 1,2 block are calculated. The respective diblock copolymers are then hydrogenated as described above. The molecular weights ($M_n$) are determined by the G.P.C. and D.S.V. methods and the microstructure by Infrared analysis.

Physical properties of the products are tabulated below including dilute solution viscosity (D.S.V.), percent gel, percent hydrogenation, glass transition temperature (Tg), melting point (Tm) and ratio of mol. wts. of 1,4 block to 1,2 block (1,4/1,2).

TABLE I

| Run: | A | B | C | D | E | F |
|---|---|---|---|---|---|---|
| Mol. Wt. | | | | | | |
| 1,4 block | 111,000 | 99,000 | 139,000 | 173,000 | 115,000 | 101,000 |
| 1,2 block | 28,000 | 28,000 | 33,000 | 27,000 | 54,000 | 36,000 |
| % 1,2 in | | | | | | |
| 1,4 block | 13.5% | 12.2% | 11.2% | 13.1% | 13.9% | 11.5% |
| 1,2 block | 83.0% | 93.8% | 94.6% | 100% | 100% | 88.4% |
| D.S.V. | 1.86 | 1.65 | 2.0 | 2.93 | 2.36 | 1.76 |
| % Gel | 0.0 | 0.0 | 0.0 | 3.5 | 0.0 | 0.0 |
| Hydrogenation (%) | 96 | 90 | 87 | 100 | 96 | 100 |
| Tg (°C.) | −85 | −42 | — | −40 | −40 | −39 |
| Tm (°C.) | 98 | 86 | 83 | 94 | 97 | 100 |
| Mol. Wt. Ratio | | | | | | |
| 1,4/1,2 | 4.0 | 3.5 | 4.2 | 6.4 | 2.1 | 2.8 |

The hydrogenated products of this invention are particularly compatible and suitable for blending with polypropylene, polyethylene and polymers of other alpha-olefins to produce thermoplastic elastomers having excellent aging properties, ozone resistance and paint adhesion. "Thermoplastic elastomers" are elastomers which may be readily processed, extruded or molded by conventional thermoplastic methods and attain desirable physical properties without the necessity of vulcanization.

Satisfactory blending of the products of this invention with alpha-olefin polymers is particularly surprising in view of the fact that unhydrogenated polybutadiene, when blended with polypropylene and other polymeric alpha-olefins, gives materials having poor properties.

Advantageously, in preparing these blends the polymeric alpha-olefin has a melting point of at least 90° C. and this material is used in a proportion of about 15–48% by weight of the resulting blend. These blends may be prepared by mixing the respective materials and heating the mixture to a temperature above the melting point of the polymeric alpha-olefin. The resulting blend may be reprocessed at any time by repeating the heating above the melting point of the polymeric alpha-olefin.

Advantageously the polymeric alpha-olefin should be predominantly of isotactic configuration with a melt flow index of about 0.4–30, preferably about 2–12 (ASTM No. D1238). As much as 15% atactic configuration in the polymeric alpha-olefin may be tolerated without adverse effect on the resulting products.

The polymeric alpha-olefin is preferably derived from propylene but may also comprise polymers or copolymers of monomers having 2–8 carbon atoms, such as ethylene, 1-butene, 1-pentene, 1-hexene, 1-heptene, 1-octene, 1-nonene, 4-methyl-pentene-1, 3-methyl-hexene-1, 5-methyl-heptene-1, etc. Advantageously the comonomers used in making the copolymers are other alpha-olefins. In any case, the polymers and copolymers are such as to have melting points above 90° C. and to be predominantly of isotactic configuration.

The melting point for polypropylene is advantageously about 150°–175° C., preferably about 160° C. For polyethylene, the melting point range is advantageously about 127°–140° C., preferably about 135° C.

To facilitate the mixing or blending of the components it is desirable that the polymeric alpha-olefin is used in particulate form, advantageously in sizes of at least 1 micron and preferably of at least 5 microns or even larger. The blending is advantageously effected on a mill or other conventional equipment such as Banbury, Brabender, screw extruder, etc.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A thermoplastic elastomeric composition comprising the hydrogenated product of a diblock copolymer having one block predominantly of 1,4-polybutadiene and containing no more than 15 percent by weight of 1,2-microstructure and a second block of 1,2-polybutadiene containing at least 95 percent by weight of 1,2-microstructure, the molecular weight of said 1,2-polybutadiene block representing at least 10 percent of the total molecular weight of said copolymer, the unsaturation in said original diblock copolymer being at least 85 percent hydrogenated.

2. The composition of claim 1 in which said 1,2-polybutadiene block represents at least 25 percent of the total molecular weight.

3. The composition of claim 1 in which said unsaturation in said original diblock copolymer is at least 95 percent hydrogenated.

* * * * *